United States Patent [19]
Poffenberger

[11] Patent Number: 5,878,880
[45] Date of Patent: *Mar. 9, 1999

[54] COLLATED CLIP ASSEMBLY

[75] Inventor: John D. Poffenberger, Cincinnati, Ohio

[73] Assignee: L&P Property Management Company, Chicago, Ill.

[ * ] Notice: The term of this patent shall not extend beyond the expiration date of Pat. No. 5,564,564.

[21] Appl. No.: 888,453

[22] Filed: Jul. 7, 1997

Related U.S. Application Data

[63] Continuation-in-part of Ser. No. 675,190, Jul. 3, 1996, Pat. No. 5,682,994, which is a continuation of Ser. No. 491,233, Jun. 16, 1995, Pat. No. 5,564,564.

[51] Int. Cl.$^6$ .................................................. B65D 71/00
[52] U.S. Cl. ........................... 206/340; 206/338; 206/346
[58] Field of Search .................................... 206/338, 340, 206/343, 345, 346, 347

[56] References Cited

U.S. PATENT DOCUMENTS

| | | |
|---|---|---|
| 2,574,811 | 11/1951 | Blumensaadt . |
| 3,083,369 | 4/1963 | Peterson . |
| 3,553,794 | 1/1971 | Kneidl et al. . |
| 3,613,878 | 10/1971 | Langas et al. . |
| 3,711,931 | 1/1973 | Ladouceur et al. . |
| 3,722,670 | 3/1973 | Plunkett . |
| 3,845,860 | 11/1974 | Ladouceur et al. . |
| 3,851,759 | 12/1974 | Young et al. . |
| 4,508,220 | 4/1985 | Pearson . |
| 5,303,821 | 4/1994 | Ayers . |
| 5,314,064 | 5/1994 | Wells et al. . |
| 5,314,065 | 5/1994 | Ayers et al. . |
| 5,564,564 | 10/1996 | Poffenberger . |

FOREIGN PATENT DOCUMENTS 2250375  10/1972  Germany .

Primary Examiner—David T. Fidei
Attorney, Agent, or Firm—Wood, Herron & Evans, LLP

[57] ABSTRACT

A collated stack of U-shaped sheet metal clips, each of which has an arcuate crown portion and first and second parallel leg portions depending from the crown portion. The first leg portion of each clip is juxtaposed immediately adjacent the second leg portion of the adjacent U-shaped clip. Each clip has two spaced apertures through the arcuate crown portion and at least one upstanding tab adjacent the edge of each aperture into which a non-metal elongate flexible connector is inserted and secured by folding the tab or tabs downwardly over the top of the aperture. Alternative embodiments of sheet metal clips and methods of collating an array of such clips are disclosed.

11 Claims, 4 Drawing Sheets

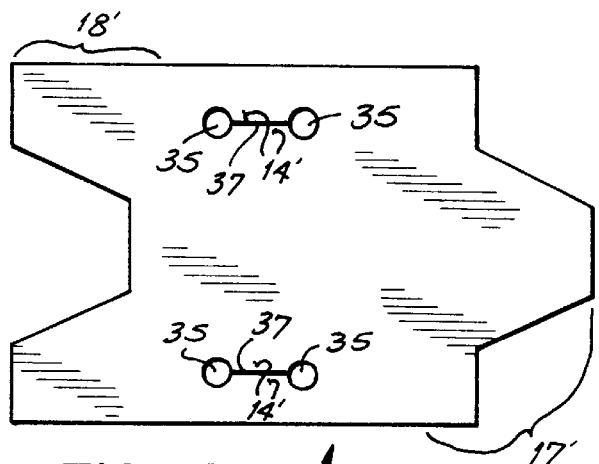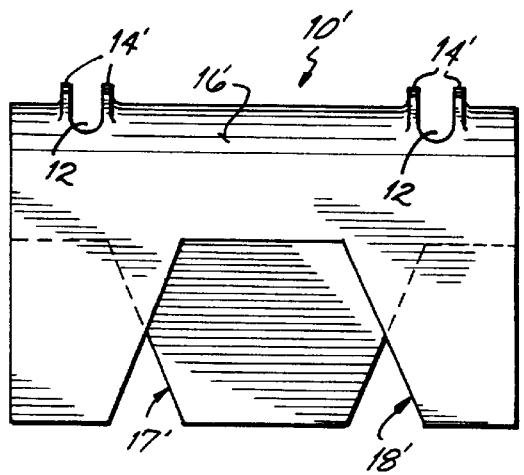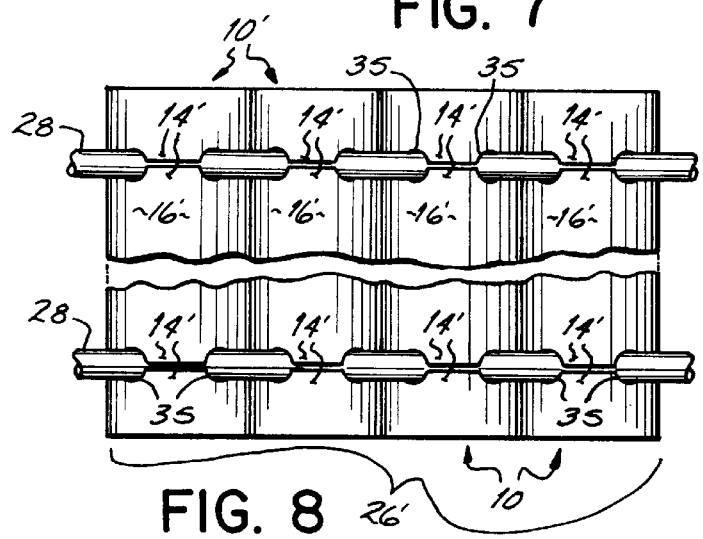

COLLATED CLIP ASSEMBLY

CROSS-REFERENCE

The present application is a continuation-in-part of my application, U.S. Ser. No. 08/675,190, filed on Jul. 3, 1996, now U.S. Pat. No. 5,682,994, which is a continuation of my application U.S. Ser. No. 08/491,233, filed on Jun. 16, 1995, now issued as U.S. Pat. No. 5,564,564, each of which is expressly incorporated herein by reference in its entirety.

FIELD OF THE INVENTION

This invention relates to an improved sheet metal clip, and more particularly to an improved collated assembly of such improved clips. The clips are collated or interconnected for use or storage in a clinching tool.

BACKGROUND OF THE INVENTION

In many industries, as for example in the mattress or bedding industry, it is common practice to secure two wires or rods, such as a spring element of a mattress to a border wire via clips made from sheet metal. Such clips are generally in a U-shape having an arcuate crown portion and oppositely spaced leg portions depending from the crown portion. The two wires to be interconnected are placed between the leg portions of the clip and the leg portions pushed together by a clinching tool, thus securing or locking the two wires together.

Such a clinching tool typically includes a generally J-shaped jaw into which the leading clip in a stack of clips is indexed. The clinching tool has a blade which shears off the first clip from a stack of clips placed inside the clinching tool. U.S. Pat. No. 2,574,811 shows such a clinching tool.

In order to operate the clinching tool it is necessary to place a plurality of clips inside the clinching tool in an orderly fashion. The clips must be similarly oriented and in an abutting relationship to one another, each clip abutting the two adjacent clips in an orderly fashion.

Clips must be interconnected to each other in a flexible manner so that the stack of clips can be wound into the clinching tool.

The clips must also be interconnected with sufficient strength so that they are able to withstand high tensile forces associated with winding and unwinding of the stack of clips upon a spool in the clinching machine. Accidental breakage of the connector connecting adjacent clips would be detrimental to the operation of the clinching machine.

One common way now used to interconnect similarly U-shaped clips together is by means of a non-metal, elongated flexible member such as rope or plastic. Slots or grooves through the arcuate portion of each U-shaped clip are lined up such that the non-metallic, elongated connecting piece of rope or plastic may be placed inside all of the grooves in order to connect the clips together in a flexible manner.

Several techniques have been developed to secure the rope or plastic connector inside the slots of each clip. One technique illustrated in U.S. Pat. No. 5,314,065 is to form the notches in the sides of the clips and to deform a portion of the clip so as to close these notches after insertion of the connector rope.

Another technique for fastening clips together has been by forming grooves or slots on the arcuate top portion of each U-shaped clip rather than on the lateral side edges. As shown in U.S. Pat. No. 5,303,821 these grooves are closed after the connecting rope or plastic is placed inside the grooves by deforming the side edges of the arcuate crown portion of each clip inwardly so as to crimp the plastic rope inside the grooves.

In all previously known U-shaped clips and method of interconnecting those clips a significant portion of each U-shaped clip must be cut away or removed in order to provide a groove or slot or notch for the reception of the connector. Removing such significant portions of the U-shaped clips weakens the strength of the clips, and wastes a substantial portion of the metal from which the clip is formed.

It has therefore been an objective of this invention to provide an improved clip and method of connecting clips into collated connected rows which is less wasteful of clip material.

It has been other objectives of the invention to provide an improved clip and method of collating and connecting clips into collated rows which results in improved clips of greater holding force with the same or less material used in the production of the clips.

SUMMARY OF THE INVENTION

The invention of the application which accomplishes these objectives comprises a collated stack of sheet metal clips made of a plurality of similarly oriented generally U-shaped clips held together by two non-metal elongate flexible members. Each U-shaped clip has an arcuate crown portion and first and second parallel leg portions depending from said crown portion. The first leg portion of each clip is juxtaposed immediately adjacent the second leg portion of the adjacent U-shaped clip. Each clip has two parallel slots through the arcuate crown portion and at least one upstanding tab adjacent the edge of each slot into which the non-metal elongate flexible connector is inserted. The connector is secured inside the slot by folding the tab or tabs downwardly into each slot after insertion of the connector.

By closing the slots by means of metal tabs deformed out of the slots during the formation of the clips, i.e. when the clips are stamped from a sheet metal strip, there is a substantial reduction in the amount of sheet metal wasted as scrap during the formation of the clips and a resulting stronger clip formed with greater holding power than prior art clips which have heretofore been connected by plastic ropes inserted into slots formed in the clip.

BRIEF DESCRIPTION OF THE DRAWINGS

FIG. 6 is a top plan view of a sheet metal blank used to form a second alternative embodiment of the invention;

FIG. 7 is a side elevational view of the second alternative embodiment of the clip of the present invention;

FIG. 8 is a top plan view of a collated and connected stack of clips formed from the second alternative embodiment of the clip;

DETAILED DESCRIPTION OF THE PREFERRED EMBODIMENT

Figure 1:
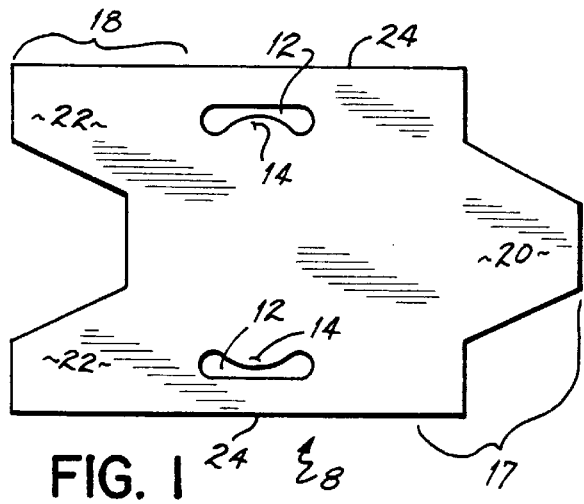
FIG. 1 is a top plan view of a sheet metal blank used to form the U-shaped clip of the present invention.
Figure 2:
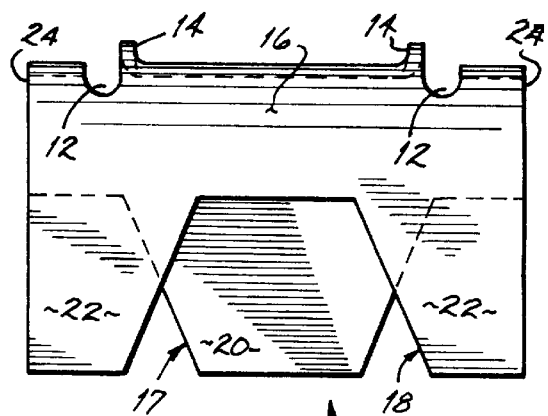
FIG. 2 is a side elevational view of the U-shaped clip formed from the blank of FIG. 1.

Referring to FIG. 1, there is illustrated a sheet metal blank 8 used to form the U-shaped clip 10 of the present invention. The blank 8 has two parallel slots 12 stamped therefrom. The slots 12 are not oval shaped, but are cut so that a tab 14 exists on the inner portion of each slot 12. Each tab 14 is in the shape of half an ellipse when planer. When stamped from a sheet metal strip, the blank 8 is generally planer. It is then bent or formed about a mandrel along a lateral mid-section plane to form the generally U-shaped clip configuration 10 shown in FIG. 2. When so formed, the blank 8 has a generally U-shaped configuration with each tab 14 extending upwardly so as to open the slots 12.

Figure 3:
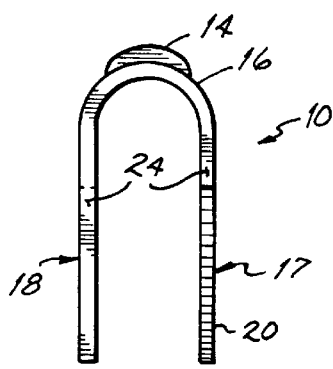
FIG. 3 is an end elevational view of the clip of FIG. 2.

As best seen in FIG. 3, each U-shaped clip 10 after having been bent or deformed into the U-shape has an arcuate crown portion 16 and first and second parallel leg portions, 17 and 18 respectively depending from the arcuate crown portion 16. The first leg portion 17 consists of one centrally located leg 20 which is tapered such that its width narrows as the leg extends away from the central arcuate portion 16 of the clip 10. The second leg portion 18 consists of two outer legs 22 which have a width which also decreases as the leg extends away from the central arcuate portion 16 of the clip 10.

Each clip has two opposed lateral side edges 24 which define the width W of the clip. Each lateral side edge 24 extends down along the outer edge of outer legs 22. The two parallel slots 12 on the arcuate crown portion 16 are proximate the lateral side edges 24 of the clip 10.

Figure 4:
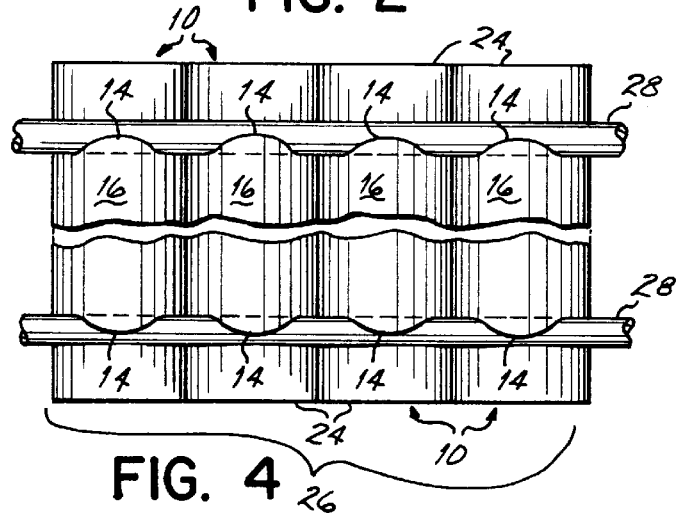
FIG. 4 is a top plan view of a collated and connected stack of U-shaped sheet metal clips.
Figure 5:
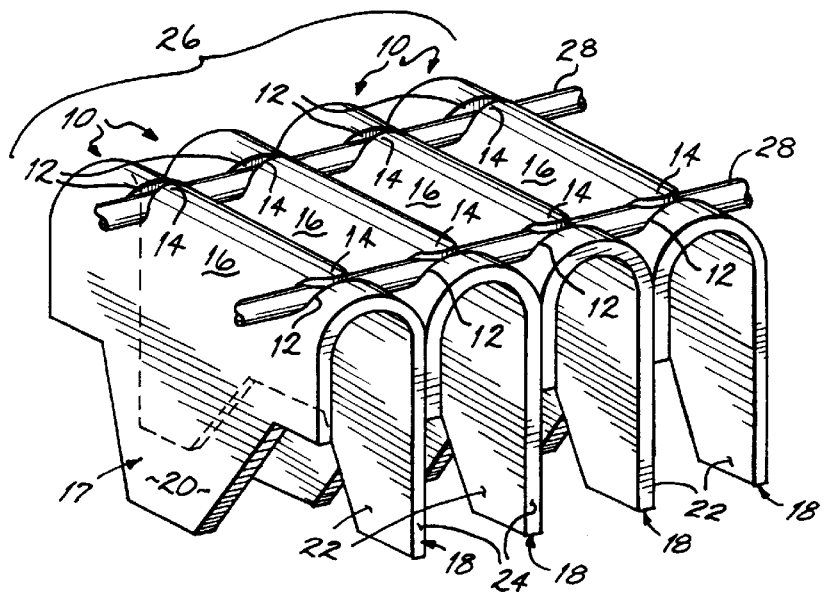
FIG. 5 is a perspective view of the collated and connected stack of U-shaped sheet metal clips of FIG. 4.

As shown in FIGS. 4 and 5, a plurality of clips 10 are aligned in a similar orientation having their central arcuate portions 16 parallel with one another and the first leg portion 17 of each clip 10 juxtaposed immediately adjacent the second leg portion 18 of an adjacent clip. When the clips 10 are juxtaposed in such a manner the slots 12 of each clip 10 are co-linearly aligned to permit a non-metallic elongate flexible connector 28 to be inserted in the slots 12 and extend the length of the aligned clips 10. The aligned plurality of clips 10 thus form a collated stack 26 of clips 10.

Once the elongated flexible connectors 28 are inserted into the linear slots 12, a roller or other suitable means is used to pass over the central arcuate portions of the clips and push the tabs 14 downward so that the tabs 14 extend over the slots 12 in order to secure the connectors 28 in the slots 12. Once the tabs 14 are pushed down, the collated stack 26 is held together by the connectors 28 as shown in FIG. 4 and 5.

The connectors 28 used to interconnect adjacent aligned clips 10 into a collated stack 26 are preferably fabricated from a plastic material, such as a low density polyethylene or polyester plastic. The connectors 28 provide a flexibility in the collated stack 26 of clips 10 which is needed when the stack 26 is bent and rolled into a spool for insertion into a clinching tool. The connectors 28 have the required tensile strength to withstand pulling and twisting forces without breaking. Also, when a last clip is cut off from the stack there are no sharp or jagged barbs left over to injure workers or tear fabric covering the clipped wires.

FIGS. 6–8 illustrate a second alternative embodiment of the present invention. For the sake of convenience, identical parts or elements of this alternative embodiment which are identical to similar elements of the first embodiment of FIGS. 1–5 have been denoted by the same numeral as used for that same element of FIGS. 1–5 but followed by a prime mark.

As shown in FIG. 8, this second alternative embodiment of the present invention consists of a collated stack of clips 26'. In this embodiment, the slot and slot closure tab features of each clip 10' are slightly different from those features of the clip 10 of the first preferred embodiment of the invention.

As shown in FIG. 6, each clip 10' is formed from a sheet metal blank 8', which has two slots 12', each of which is formed by two holes 35 stamped from the blank 8' and connected by cut lines 37 through the thickness of the metal blank 8'.

After having been stamped from a strip of sheet metal, this blank 8' is bent or deformed about a mandrel to form a U-shaped clip 10' as illustrated in FIG. 7. During the formation of the flat blank 8' into U-shaped clip 10', the metal tabs 14' between holes 35 are bent upwardly, forming two upstanding tabs 14' adjacent each of the two slots 12'. All of the features of the U-shaped clip 10' are otherwise identical to those described above in the first preferred embodiment, with the exception of dual tabs 14' bordering each slot 12' rather than a single tab bordering each slot as in the first preferred embodiment of the invention.

Again a series of clips 10' are aligned and juxtaposed next to one another in a similar manner to that described hereinabove such that a connector 28 may be inserted into each of the co-linearly aligned slots 12' of adjacent clips 10'. After insertion of the connectors into the slots 12' a roller or rollers are passed over the arcuate crown portion of the clips 10' so as to push down all four tabs 14' of each clip 10', thereby securing the connector 28 inside the slots 12'.

This second alternative embodiment utilizes an even greater percentage of the sheet metal blank 8' to form the clip 10', resulting in a stronger more productive clip 10' than even that of the first embodiment.

Figure 9:
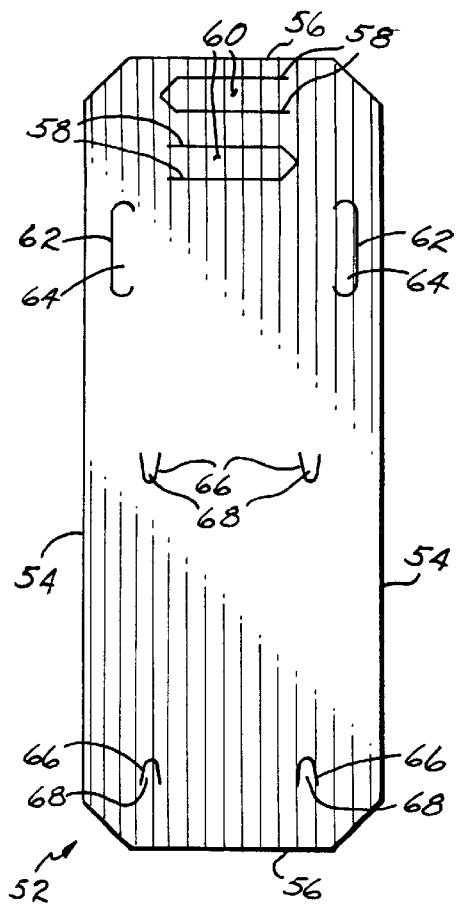
FIG. 9 is a top plan view of a sheet metal blank used to form a third alternative embodiment of the invention.
Figure 10:
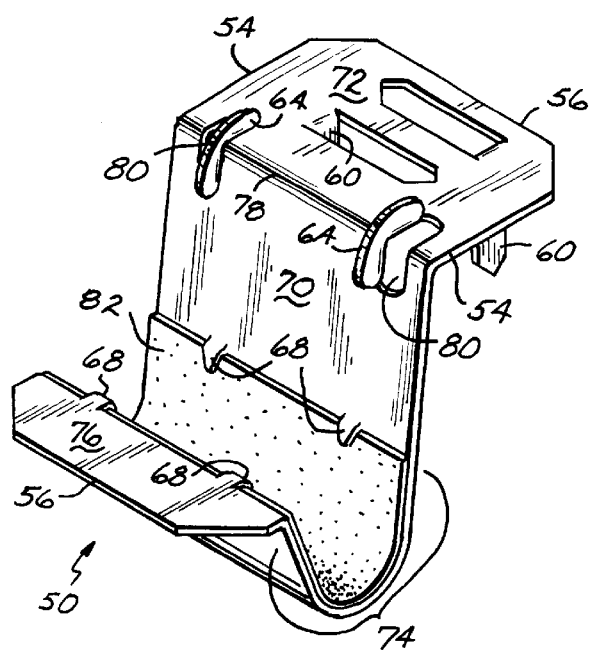
FIG. 10 is a perspective view of the third alternative embodiment of the clip of the present invention.
Figure 11:
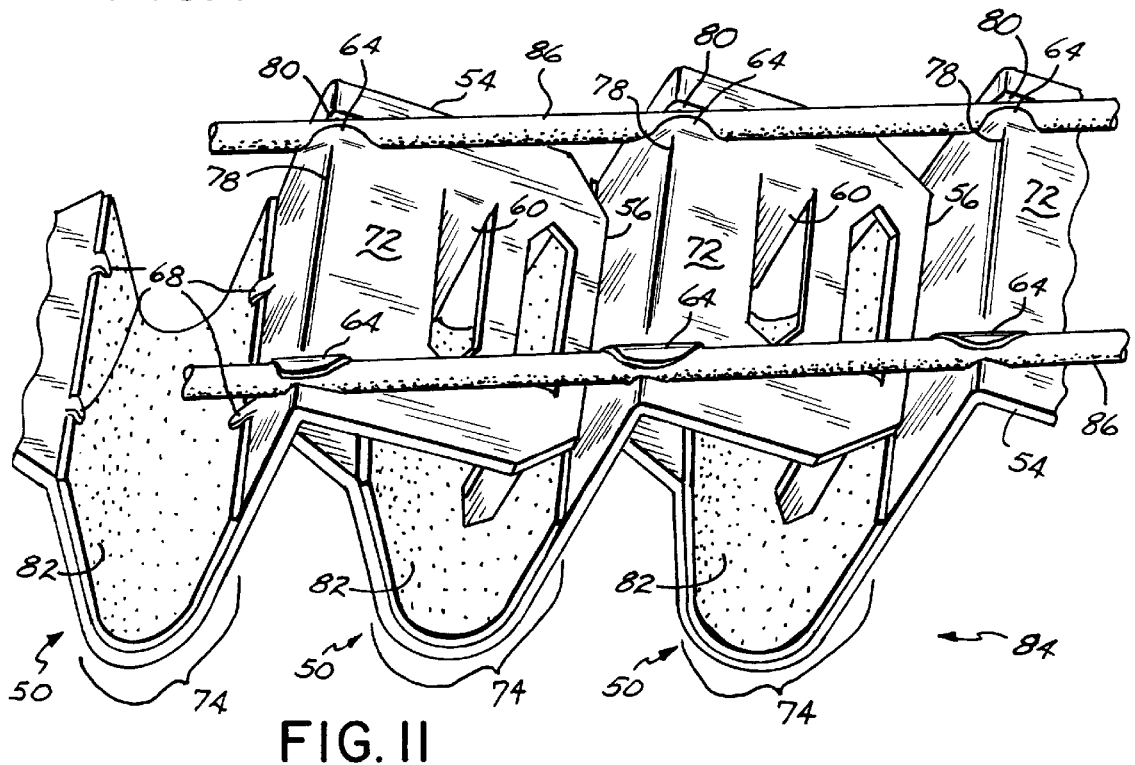
FIG. 11 is a perspective view of a collated and connected stack of clips formed from the third alternative embodiment of the clip.
Figure 12:
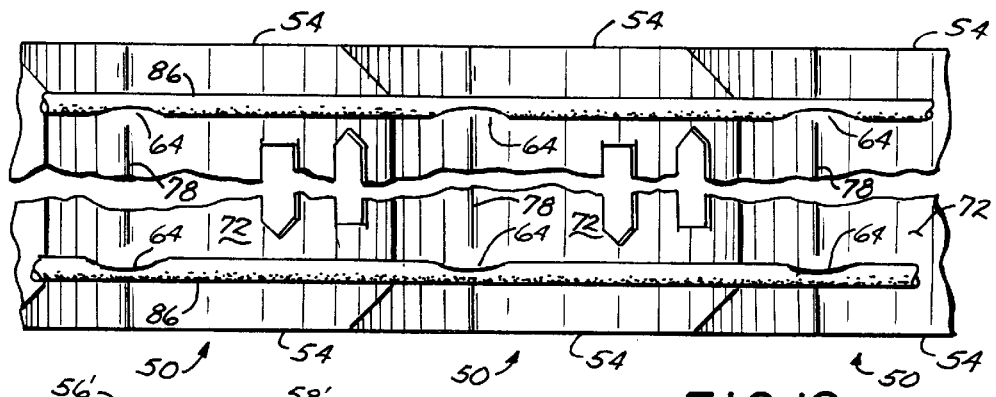
FIG. 12 is a top plan view of the collated and connected stack of clips of FIG. 11.

Referring now to FIGS. 9–12, a third embodiment of a sheet metal clip, designated 50 in FIGS. 10–12, is shown in accordance with the principles of the present invention. As those skilled in the art will readily appreciate, sheet metal clip 50 is particularly adapted for use in securing sinuous spring bands to wooden rails of a furniture seat frame. Sheet metal clip 50 is formed from a generally rectangular sheet metal blank 52 which is shown in FIG. 9. Each sheet metal blank 52 is preferably formed in a continuous punch press operation from a sheet of feed stock material and includes uninterrupted lateral side edges 54 and opposite edges 56 at remote ends of the blank 52. During the punch press operation, the thickness of the sheet metal blank 52 is sheared and formed at 58 to form a pair of prongs or stakes 60 which initially lie in the plane of the blank 52, and, after forming, protrude downwardly at right angles to the blank 52. The blank 52 is also sheared and formed at 62 to form a pair of upstanding tabs 64 which are disposed proximate the lateral side edges 54 but inwardly therefrom as will be described in more detail below. Additionally, the blank 52 is sheared and formed at 66 to form retainers 68 for purposes to be discussed below.

Referring now to FIG. 10, the sheet metal blank 52 of FIG. 9 is preferably formed through progressive bending and forming operations into the sheet metal clip 50. Clip 50 preferably includes a substantially planar body portion or leg 70, an integral crown portion 72 and a generally U-shaped hook portion 74 which terminates in a flange 76. The crown portion 72 has a width defined by the uninterrupted lateral side edges 54 and is integral with the planar body portion 70. The crown portion 72 extends generally perpendicularly to the body portion 70 about a bend 78. During the progressive formation of sheet metal clip 50, the tabs 64 are preferably bent upwardly from inside edges of apertures 80 (as viewed in FIG. 10) while stakes 60 are bent downwardly from the crown 72. Alternatively, in an embodiment not shown, the tabs 64 may be formed to be bent upwardly from outside edges of apertures 80. Retainers 68 are bent to capture and retain a sheet of cushioning material 82 in the hook portion 74 of the clip, such as a soft plastic material.

Referring to FIGS. 11 and 12, the formed sheet metal clips 50 are shown collated into a stack or array 84 of clips in accordance with the principles of the present invention. To this end, the clips 50 are preferably collated in a single continuous row of clips. In this collated arrangement, the crown 72 of one clip 50 preferably overlies the U-shaped hook portion 74 of an adjacent clip 50 as shown in FIG. 11. In the presently preferred embodiment illustrated in FIGS. 11 and 12, parallel lengths of non-metallic, flexible connectors 86, e.g., plastic cords made from a plastic material such as low density polyethylene or polyester plastic, are inserted into the apertures 80 in crown portion 72, and the tabs 64 are folded downwardly to capture the connectors 86 in the apertures 80 to secure the clips 50 in the collated stack or array 84.

Figure 13:
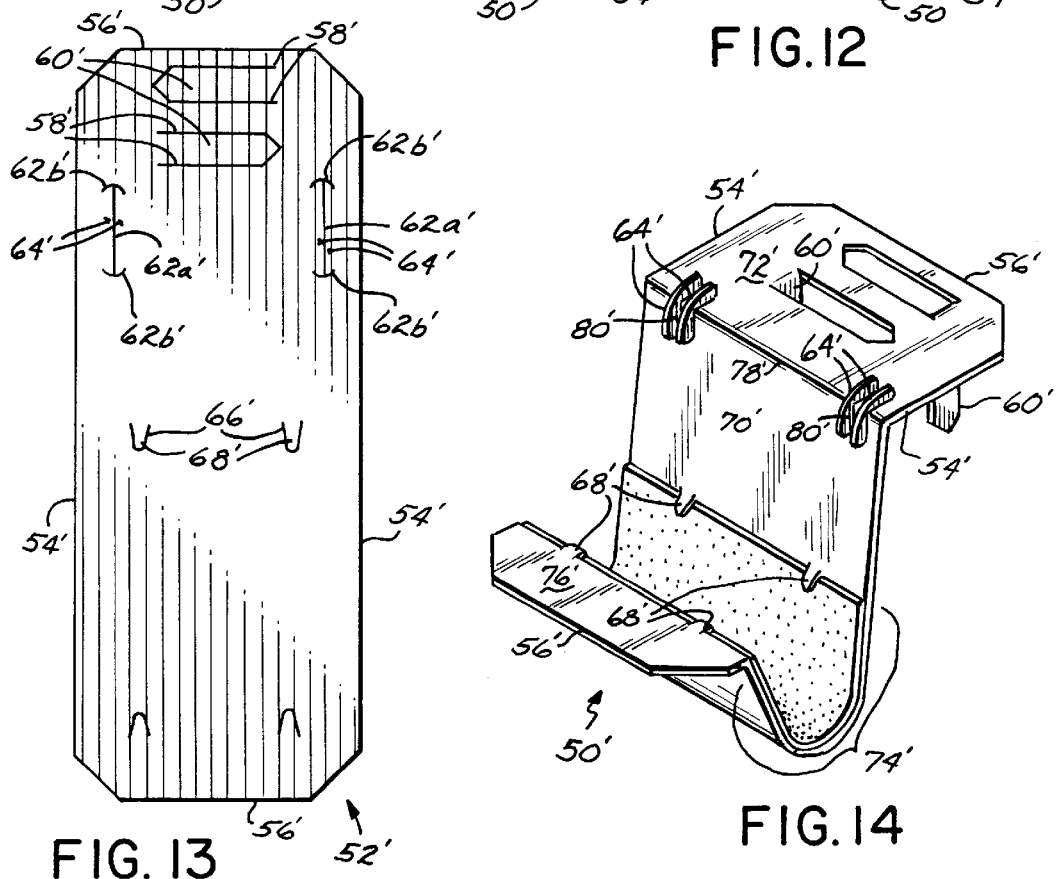
FIG. 13 is a top plan view of a sheet metal blank used to form a fourth alternative embodiment of the invention.
Figure 14:
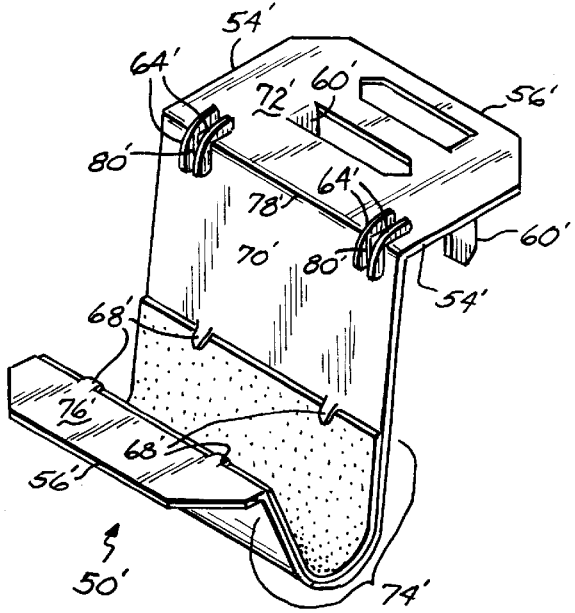
FIG. 14 is a perspective view of the fourth alternative embodiment of the clip of the present invention.
Figure 15:
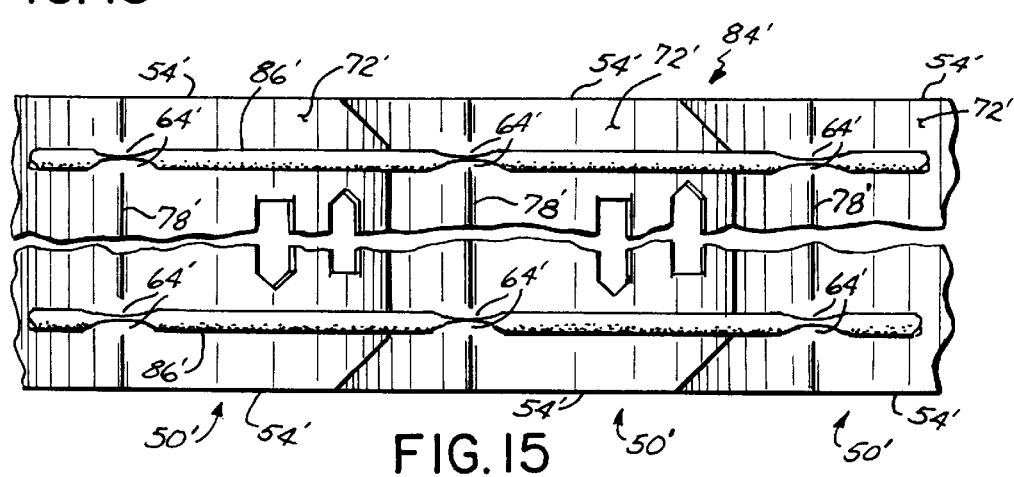
FIG. 15 is a top plan view of a collated and connected stack of clips formed from the fourth alternative embodiment of the clip.

Now referring to FIGS. 13–15, a fourth embodiment of a sheet metal clip is shown designated as 50' in FIGS. 14–15. Clip 50' is formed from a sheet metal blank 52' as shown in FIG. 13, preferably in a similar continuous punch press operation as discussed with reference to FIG. 9. In particular, sheet metal blank 52' includes uninterrupted lateral side edges 54' and opposite edges 56' at remote ends of the blank 52. Stakes 60' and retainers 68' are preferably formed at 58' and 66', respectively, in the same manner as discussed with reference to FIG. 9.

In this embodiment, however, two pairs of upstanding tabs 64' are formed proximate the lateral side edges 54' but inwardly therefrom by punching and forming the blank 52' at 62a' and 62b', as shown in FIG. 13.

As shown in FIG. 14, clip 50' is progressively formed from sheet metal blank 52' in a similar fashion as discussed above in relation to FIG. 10. Clip 50' preferably includes a substantially planar body portion or leg 70', a crown portion 72', and a generally U-shaped hook portion 74' which terminates in a flange 76'. A sheet of cushioning material 82', e.g., a soft plastic, is retained and captured in the hook portion 74' by the retainers 68'. The crown portion 72' has a width defined by the uninterrupted lateral side edges 54' and is formed integrally with the body portion 70', generally perpendicularly thereto, by bending the blank 52' at 78'. During the progressive formation of sheet metal clip 50' of this embodiment, the tabs 64' are preferably bent upwardly from inside and outside edges of apertures 80' (as viewed in FIG. 13) while stakes 60' are bent downwardly from crown 72'.

Referring to FIG. 15, the formed sheet metal clips 50' are shown collated into a stack or array 84' of clips wherein the clips are preferably collated in a single continuous row. In this collated arrangement, the crown 72' of one clip 50' preferably overlies the U-shaped hook portion 74' of an adjacent clip 50' as shown in FIG. 15. Parallel lengths of non-metallic, flexible connectors 86', e.g., plastic cords, are inserted into the apertures 80' of crown portion 72', and the tabs 64' are preferably folded downwardly to capture the connectors 86' in the apertures 80' to secure the clips 50' in the collated array 84'.

From the above disclosure of the general principles of the present invention and the preceding detailed description of the preferred and alternative embodiments, those skilled in the art will readily comprehend the various modifications which may be made to the present invention without departing from the spirit of my invention. Therefore, I desire to be limited only by the scope of the following claims.

What is claimed is:

1. A collated stack of sheet metal clips comprising: a plurality of similarly oriented sheet metal clips, each clip having a crown portion and opposed uninterrupted lateral side edges defining the width of said clip, each clip having two spaced apertures through said crown portion entirely spaced inwardly from said lateral side edges into which a length of non-metallic, flexible connector is inserted, and a downwardly folded tab immediately adjacent each aperture on the inside thereof closable and extending over each said aperture and securing said connector in said aperture, said connector in turn securing said sheet metal clips in said collated stack.

2. A collated stack of sheet metal clips comprising: a plurality of similarly oriented sheet metal clips, each clip having a crown portion, and opposed uninterrupted lateral side edges defining the width of said clip, each clip having two spaced apertures through said crown portion entirely spaced inwardly from said lateral side edges into which a length of non-metallic, flexible connector is inserted, and a downwardly folded tab immediately adjacent each aperture closable and extending over each said aperture and securing said connector in said aperture, said connector in turn securing said sheet metal clips in said collated stack.

3. A sheet metal clip comprising a crown portion, and opposed uninterrupted lateral side edges defining the width of said clip, the crown portion having two spaced apertures therethrough entirely spaced inwardly from said lateral side edges into which a non-metallic, flexible connector may be inserted, each said aperture having a downwardly foldable tab immediately adjacent thereto closable and extendable over said aperture in order to secure said connector in said aperture.

4. A collated stack of sheet metal clips comprising: a plurality of similarly oriented sheet metal clips, each clip having a crown portion, and opposed uninterrupted lateral side edges defining the width of said clip, each clip having two spaced apertures in said crown portion entirely spaced inwardly from said lateral side edges and at least one tab immediately adjacent each aperture, each of said tabs and said spaced apertures being formed to receive and capture a non-metallic, flexible connector inserted therebetween in order to secure said connector to said crown portion.

5. A collated stack of sheet metal clips comprising: a plurality of similarly oriented sheet metal clips, each clip having a crown portion, opposed uninterrupted lateral side edges defining the width of said clip, each clip having two spaced apertures through said crown portion entirely spaced inwardly of said lateral side edges, and at least one leg portion depending from said crown portion, said leg portion of each clip being juxtaposed adjacent the leg portion of an adjacent clip, each clip having two spaced tabs extending from said crown portion inwardly of said lateral side edges, said tabs being formed to receive and capture a non-metallic, plastic connector inserted between said tab and said crown portion in order to secure said connector to said crown portion.

6. A method of manufacturing a collated array of sheet metal clips comprising the steps of:

forming a plurality of planar sheet metal blanks into clips, each clip having a crown portion, and opposed uninterrupted lateral side edges defining the width of said clip;

forming a pair of spaced apertures through said crown portion entirely spaced inwardly from said lateral side edges;

forming at least one tab on said crown portion immediately adjacent each of said apertures from material displaced from said crown portion;

aligning a plurality of similarly oriented clips; and inserting and capturing a non-metallic, flexible cord between each of said tabs and said apertures to secure said cord to said crown portion and in turn to secure said sheet metal clips in said collated array.

7. The method of claim 6 wherein said capturing step comprises deflecting said tabs downwardly over said cords after insertion of said cords so as to secure said cords to said crown portion.

8. The method of claim 6 wherein said capturing step comprises frictionally engaging said cords between said tabs and said crown portion so as to secure said cords to said crown portion.

9. A sheet metal clip made from sheet metal having a substantially uniform thickness dimension, said clip comprising a crown portion, and opposed uninterrupted lateral side edges defining the width of said clip, the crown portion having two spaced apertures extending completely therethrough for the full thickness of said sheet metal and entirely spaced inwardly of said lateral side edges into which a non-metallic, flexible connector may be inserted, each said aperture having a downwardly foldable tab immediately adjacent thereto closable and extendable over said aperture in order to secure said connector in said aperture.

10. A collated stack of sheet metal clips comprising: a plurality of similarly oriented sheet metal clips made from sheet metal having a substantially uniform thickness dimension, each clip having a crown portion and opposed uninterrupted lateral side edges defining the width of said clip, each clip having two spaced apertures extending completely through the full thickness of said crown portion and entirely spaced from said lateral side edges into which a length of non-metallic, flexible connector is inserted, and a downwardly folded tab immediately adjacent each aperture closable and extending over each said aperture and securing said connector in said aperture, said connector in turn securing said sheet metal clips in said collated stack.

11. A method of manufacturing a collated array of sheet metal clips comprising the steps of:

forming a plurality of planar sheet metal blanks from sheet metal having a substantially uniform thickness dimension;

forming said plurality of planar sheet metal blanks into clips, each clip having a crown portion, and opposed uninterrupted lateral side edges defining the width of said clip;

forming a pair of spaced apertures through said crown portion entirely spaced inwardly from said lateral side edges;

forming at least one tab on said crown portion immediately adjacent each of said apertures from material displaced from the full thickness of said crown portion;

aligning a plurality of similarly oriented clips; and inserting and capturing a non-metallic, flexible cord between each of said tabs and said apertures to secure said cord to said crown portion and in turn to secure said sheet metal clips in said collated array.

* * * * *